US007814640B2

(12) United States Patent
Takashima et al.

(10) Patent No.: US 7,814,640 B2
(45) Date of Patent: Oct. 19, 2010

(54) MANUFACTURING METHOD OF DIE FOR MANUFACTURING LIQUID EJECTING HEAD, AND MATERIAL BLOCK USED IN THE SAME

(75) Inventors: Nagamitsu Takashima, Nagano-ken (JP); Ryoji Uesugi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1329 days.

(21) Appl. No.: 11/320,900

(22) Filed: Dec. 30, 2005

(65) Prior Publication Data

US 2006/0174737 A1 Aug. 10, 2006

Related U.S. Application Data

(63) Continuation-in-part of application No. PCT/JP2004/009590, filed on Jun. 30, 2004.

(30) Foreign Application Priority Data

Jul. 3, 2003 (JP) .......................... P2003-191418

(51) Int. Cl.
*B23P 13/04* (2006.01)

(52) U.S. Cl. .............................. 29/557; 29/558; 29/412

(58) Field of Classification Search .................. 29/557, 29/558, 412, 417, 415, 416; 72/496
See application file for complete search history.

(56) References Cited

U.S. PATENT DOCUMENTS

| | | | | | |
|---|---|---|---|---|---|
| 1,804,662 | A * | 5/1931 | Wells | 72/332 |
| 3,165,402 | A * | 1/1965 | Finkl | 420/109 |
| 4,227,396 | A * | 10/1980 | Crowe | 72/469 |
| 4,485,657 | A * | 12/1984 | Ridley et al. | 72/88 |
| 4,793,219 | A * | 12/1988 | Wozniak | 76/107.1 |
| 5,509,287 | A * | 4/1996 | Garden | 72/88 |
| 5,761,787 | A * | 6/1998 | Kragle et al. | 29/418 |
| 6,134,783 | A * | 10/2000 | Bargman et al. | 29/890.03 |
| 6,253,442 | B1 * | 7/2001 | Benson et al. | 29/557 |
| 6,957,557 | B2 * | 10/2005 | LeVey | 72/88 |
| 7,040,134 | B2 * | 5/2006 | Akahane et al. | 72/324 |
| 7,076,989 | B2 * | 7/2006 | LeVey | 72/469 |
| 7,100,415 | B2 * | 9/2006 | Takashima et al. | 72/335 |
| 7,165,433 | B2 * | 1/2007 | Akahane et al. | 72/335 |
| 7,249,484 | B2 * | 7/2007 | Takashima et al. | 72/335 |
| 7,543,381 | B2 * | 6/2009 | Ogawa et al. | 29/890.1 |
| 7,546,757 | B2 * | 6/2009 | Ogawa et al. | 72/325 |

FOREIGN PATENT DOCUMENTS

| | | | |
|---|---|---|---|
| JP | 2-268929 | A | 11/1990 |
| JP | 8-39359 | A | 2/1996 |
| JP | 8-104009 | A | 4/1996 |

(Continued)

*Primary Examiner*—Essama Omgba
(74) *Attorney, Agent, or Firm*—Sughrue Mion, PLLC

(57) ABSTRACT

In order to manufacture a die for forming recesses in a metallic plate which are adapted to be pressure generating chambers in a liquid ejecting head, it is prepared a metallic block adapted to allow a plurality of dies arrayed in a first direction to be cut out, and having a flat end face extending in the first direction. The dies are cut out from the metallic block. A distance between a first part of each of the dies which is adapted to be working members for forming the recesses and the flat end face is made uniform.

1 Claim, 14 Drawing Sheets

FOREIGN PATENT DOCUMENTS

| | | | |
|---|---|---|---|
| JP | 8-238776 | A | 9/1996 |
| JP | 9-311459 | A | 12/1997 |
| JP | 11-36005 | A | 2/1999 |
| JP | 11-245232 | A | 9/1999 |
| JP | 2000-263799 | A | 9/2000 |

* cited by examiner

FIG. 13

HARDNESS MEASUREMENT RESULTS

HRC

| No. | 1 | 2 | 3 | 4 | 5 | AVERAGE |
|---|---|---|---|---|---|---|
| 1 | 64.8 | 64.5 | 64.9 | 64.7 | 64.6 | 64.7 |
| 2 | 65.3 | 65.3 | 65.2 | 65.1 | 64.9 | 65.2 |
| 3 | 64.9 | 64.9 | 65.0 | 65.0 | 64.9 | 64.9 |

FIG. 14

MEASUREMENT RESULTS OF AMOUNT OF RESIDUAL AUSTENITE vol%

| No. | α−Fe | γ−Fe | $M_6C$ | MC |
|---|---|---|---|---|
| 1 | 88.2 | 0.7 | 8.9 | 2.2 |
| 2 | 88.4 | 1.7 | 8.1 | 1.8 |
| 3 | 88.1 | 0.8 | 8.8 | 2.3 |

MANUFACTURING METHOD OF DIE FOR MANUFACTURING LIQUID EJECTING HEAD, AND MATERIAL BLOCK USED IN THE SAME

CROSS-REFERENCE TO RELATED APPLICATION

This is a continuation-in-part application of PCT/JP2004/009590 filed on Jun. 30, 2004.

BACKGROUND OF THE INVENTION

The present invention relates to a manufacturing method of a die for manufacturing a liquid ejecting head, and a material block used in the method.

Liquid ejecting heads for ejecting pressurized liquid from nozzle orifices in the form of liquid droplets are known and used for various liquids. A typical example of those is an ink jet recording head (refer to Japanese Patent Publication No. 2000-263799A, for example). The ink jet recording head will be described below as an example of the conventional art.

The ink jet recording head (hereinafter referred to as "recording head") is provided with plural flow passages that correspond to respective nozzle orifices. Each flow passage originates from an ink reservoir, passes a pressure generating chamber, and reaches a nozzle orifice. To satisfy a requirement of downsizing, it is necessary that the pressure generating chambers be formed with a fine pitch that corresponds to a recording density. As a result, each partition that divides the adjoining pressure generating chambers becomes very thin. To efficiently utilize the ink pressure in each pressure generating chamber for ink droplet eject, the flow passage width of an ink supply for connecting the pressure generating chamber with the ink reservoir is smaller than the width of the pressure generating chamber. To form those minute pressure generating chambers and ink supply holes with high dimensional accuracy, the conventional recording head employs a nickel substrate satisfactorily. That is, the pressure generating chambers etc. are formed by performing plastic working on the nickel substrate using a die(s).

Incidentally, as for the die that is used for forming the pressure generating chambers etc. of the conventional recording head, a large number of dies are cut out from a thick die material in such a manner that dies are sequentially cut out one by one, so that a plurality of blank spaces from which the dies are cut out are arrayed so as to form a plurality of arrays in the die material.

In such a case that the blank spaces have to be arranged so as to form the plural arrays, the die material should be large in both lateral and longitudinal directions (the height is in the thickness direction of the material) and hence it is difficult to form, for example, martensitic metal structure (suitable for dies) in the entire die material. This is because in the case of a large die material the cooling rate in a thermal refining process is not uniform in the material, as a result of which portions where martensite is formed normally and portions where martensite and an excessive amount of residual austenite coexist are formed in the single die material. Because of such unevenness in the metal structure distribution, when the dies are cut out as described the above, they include ones that are high in hardness and durability and ones not having such quality. As such, the resulting dies are not uniform in quality.

SUMMARY OF THE INVENTION

The present invention has been made in view of the above circumstances, and the main object of the invention is to make the durability-related quality uniform among dies and to increase the durability level greatly.

In order to achieve the above object, according to the invention, there is provided a method of manufacturing a die for forming recesses in a metallic plate which are adapted to be pressure generating chambers in a liquid ejecting head, the method comprising:

preparing a metallic block adapted to allow a plurality of dies arrayed in a first direction to be cut out, and having a flat end face extending in the first direction; and cutting out the dies from the metallic block, wherein a distance between a first part of each of the dies which is adapted to be working members for forming the recesses and the flat end face is made uniform.

That is, a material for the die is a metallic material block has a flat end face. The material block has lateral, longitudinal and height directions which are so selected that the dies arrayed in the lateral and longitudinal directions can be cut out therefrom. A distance between a part adapted to be working members of each of the dies and the flat end face is made flat.

With this configuration, the material block can be subjected to the thermal refining in which the cooling rates of the future working members are made as uniform as possible. As a result, the unevenness in metal structure can be made to such a level that substantially no problems occur, and metal structure that is most suitable for increase in die durability etc. can be distributed uniformly in the working members. Therefore, the manufacturing dies that are cut out from the material block can be given sufficient durability to withstand physical loads that are imposed on the working members at the time of plastic working.

The first part may be situated in the vicinity of the flat end face. In this case, a material region that has been thermally refined at a high cooling rate in the vicinity of the end face becomes a harder material such as a material having martensitic structure and is used for formation of the working members. This makes it possible to make the portions strongest that will receive highest physical loads at the time of plastic working.

The manufacturing method may further comprise subjecting the metallic block to thermal refining in advance, so that at least the first part has a metal structure suitable for the function of the working members. In this case, strengthened by the thermal refining, the material that is located parallel with the end face becomes a material region that is uniform and high in strength. The metal structure of the working members that are formed from the material region having such properties exhibits its highest strength at the time of plastic working and greatly increases the durability of the manufacturing die.

The metal structure may be a martensite in which an amount of residual austenite is 2% or less in terms of a capacity ratio thereof. In this case, the cooling rate of quenching can be made uniform almost in the entire material block, and the use of such a material block allows the main metal structure of the material to be made martensitic structure and, at the same time, allows the amount of residual austenite to be made 2% or less in terms of capacity ratio. This makes it possible to greatly increase the durability in use of the manufacturing die.

A single array of the dies may be cut out from the metallic block. In this case, an array of the manufacturing dies are cut out from the material block that is approximately uniform in metal structure in its entirety. Therefore, the metal structure distribution of each manufacturing die is superior, that is, low in the degree of unevenness and the working members can be formed so as to be best in metal structure.

At least one outer face of each of the dies may share one of an outer faces of the metallic block. In this case, the top face and the bottom face of each manufacturing die can be obtained directly from the top face and the bottom face of the material block at the moment when it is cut out. This makes it unnecessary to perform working of finishing the outward form of each manufacturing die. Even in the case where the working of finishing the outward form of each manufacturing die, the finishing margins can be made very small, which is effective in decreasing the amount of waste material and the number of working steps. Further, since only one die can be cut out in the height direction of the material block, the structure unevenness among cut-out dies are low and hence they are uniform in mechanical characteristics.

The manufacturing method may further comprise forming the metallic block by subjecting metal powder to hot isostatic press sintering. In this case, the material block is solidified uniformly at a high density, which is effective in manufacture strong manufacturing dies. Further, since the structure of the thus-obtained material block is dense and uniform, the working members can be made uniform in strength, which is advantageous to very fine plastic working for forming the pressure generating chambers of the ink jet head, for example.

The metal powder may be nitrided special steel. In this case, each of the material block and the manufacturing die has substantially no gradation in nitrogen density and exhibits uniform mechanical characteristics. Therefore, the working members can be made uniform in strength, which is advantageous to very fine plastic working for forming the pressure generating chambers of the ink jet head, for example.

The metal powder may be nitrided high-speed tool steel. In this case, advantages in strength, abrasion resistance, etc. of the nitrided high-speed tool steel which is less prone to seizure and superior in chipping resistance are added. Therefore, the durability etc. of the manufacturing die are increased further. And an event can be prevented that wear, cracks, or the like occurs early in the working members and lowers the accuracy of the shape of an ink jet head produced by working or requires early replacement of the die.

According to the invention, there is also provided a metallic block adapted to adapted to allow a plurality of dies arrayed in a first direction to be cut out, each of the dies is adapted to be used to form recesses in a metallic plate, the metallic block comprising:

a flat end face extending in the first direction; and a region adapted to be a first part of each of the dies which is adapted to be working members for forming the recesses, wherein a distance between the flat end face and the first part is made uniform.

That is, a material for the die is a metallic material block has a flat end face. The material block has lateral, longitudinal and height directions which are so selected that the dies arrayed in the lateral and longitudinal directions can be cut out therefrom. A distance between a part adapted to be working members of each of the dies and the flat end face is made flat.

With this configuration, the material block can be subjected to the thermal refining in which the cooling rates of the future working members are made as uniform as possible. As a result, the unevenness in metal structure can be made to such a level that substantially no problems occur, and metal structure that is most suitable for increase in die durability etc. can be distributed uniformly in the working members. Therefore, the manufacturing dies that are cut out from the material block can be given sufficient durability to withstand physical loads that are imposed on the working members at the time of plastic working.

BRIEF DESCRIPTION OF THE DRAWINGS

The above objects and advantages of the present invention will become more apparent by describing in detail preferred exemplary embodiments thereof with reference to the accompanying drawings, wherein:

FIG. 13 is a table showing hardness measurement results; and

FIG. 14 is a table showing measurement results of the amount of residual austenite.

DETAILED DESCRIPTION OF THE EMBODIMENTS

An embodiment of the present invention will be hereinafter described with reference to the accompanying drawings.

Liquid ejecting heads as subjects of manufacture in the invention are such as to be able to function to eject various liquid as mentioned above. The illustrated embodiment is directed to an ink jet recording head that is a typical example of such liquid ejecting heads.

FIGS. 1 through 3C show the structure of a liquid ejecting head that is manufactured by using a manufacturing die that is manufactured according to the invention.

Figure 1:
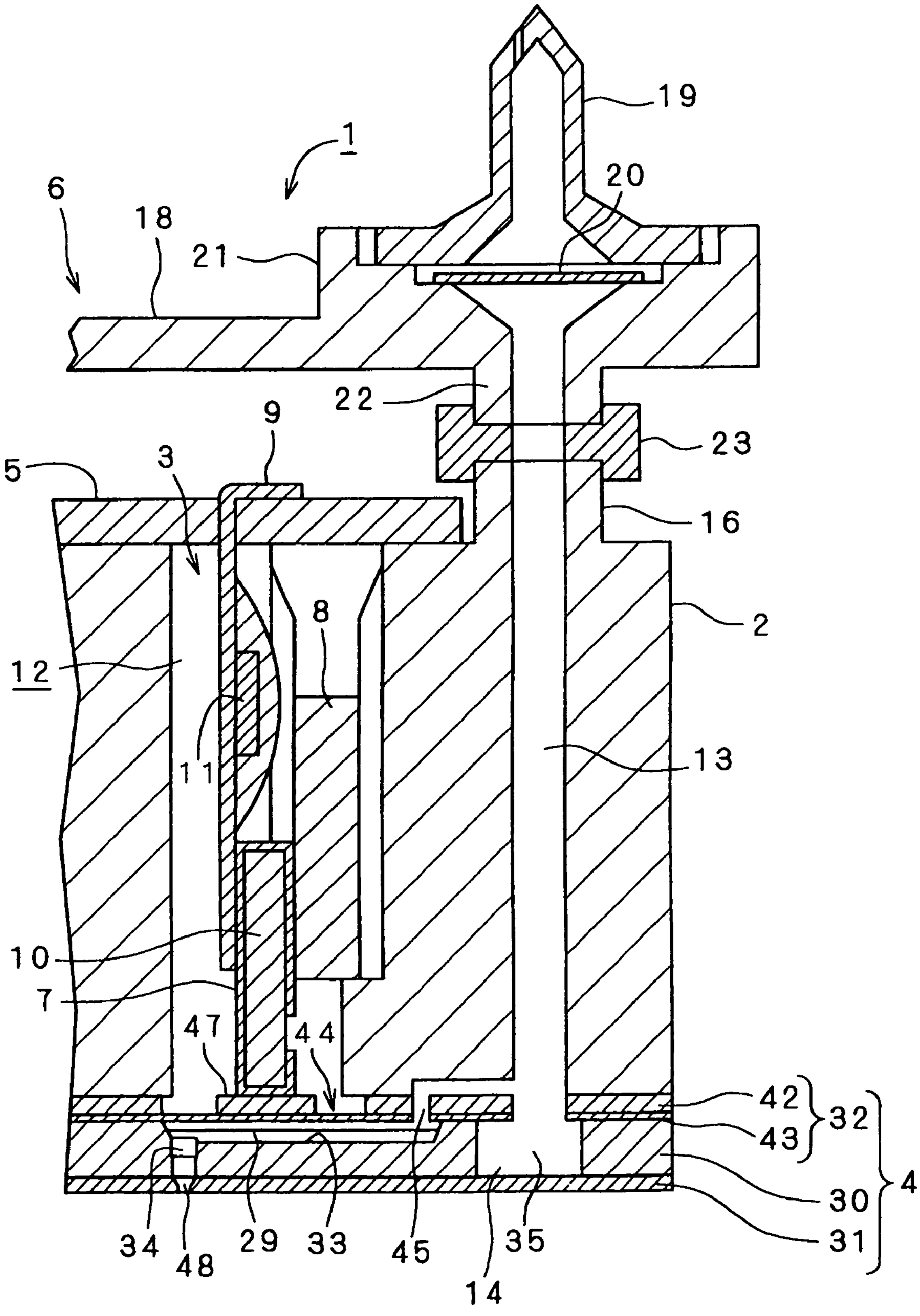
FIG. 1 is a sectional view of an ink jet recording head.

As shown in FIG. 1, a recording head 1 is generally composed of a case 2, vibrator units 3 that are housed in the case 2, a flow passage unit 4 that is joined to a front end face of the case 2, a connection board 5 that is placed on an attachment face of the case 2 that is opposite to the front end face, and a supply needle unit 6 that is attached to the attachment face of the case 2.

Each vibrator unit 3 is generally composed of a piezoelectric vibrator array 7, a fixing plate 8 to which the piezoelectric vibrator array 7 is joined, and a flexible cable 9 for supplying drive signals to the piezoelectric vibrator array 7.

The piezoelectric vibrator array 7 is provided with plural piezoelectric vibrators 10 that are arranged in a row. Each piezoelectric vibrator 10 is a kind of pressure generation element as well as a kind of electro-mechanical conversion element.

A fixed end portion of each piezoelectric vibrator 10 is joined to the fixing plate 8, whereby its free end portion projects outward from the tip end face of the fixing plate 8. That is, each piezoelectric vibrator 10 is supported by the fixing plate 8 in a cantilevered manner. In the free end portion of each piezoelectric vibrator 10, piezoelectric bodies and internal electrodes are laminated one on another. The piezoelectric vibrator 10 expands or contracts in the element longitudinal direction when confronting electrodes are given a potential difference.

The flexible cable 9 is electrically connected to the piezoelectric vibrators 10 in the side faces of the fixed end portions that are opposite to the fixing plate 8. A control IC 11 for controlling the driving etc. of the piezoelectric vibrators 10 is mounted on one face of the flexible cable 9. The fixing plate 8 which supports the piezoelectric vibrators 10 is a plate-shaped member that is rigid enough to sustain reaction forces from the piezoelectric vibrators 10, and is preferably a metal plate such as a stainless plate.

For example, the case 2 is a block-shaped member that is formed by molding a thermosetting resin such as an epoxy resin. The reason why the case 2 is formed by molding a thermosetting resin is that thermosetting resins are mechanically stronger than general resins and have a smaller linear expansion coefficient than general resins and hence exhibit smaller deformation in the event of a variation in environment temperature. Accommodation spaces 12 capable of accommodating the respective vibrator units 3 and ink supply passages 13 each being part of an ink passage are formed inside the case 2.

Each accommodation space 12 is a space that is large enough to accommodate the vibrator unit 3. In a front end portion of the accommodation space 12, an inner wall is partially projected so as to serve as a fixing plate contact face. The vibrator unit 3 is accommodated in the accommodation space 12 in such a manner that the tip end faces of the respective piezoelectric vibrators 10 appear in the opening of the accommodation space 12. In this accommodation state, a front end face of the fixing plate 8 is brought into contact with and is bonded to the fixing plate contact face.

The ink supply passages 13 penetrate through the case 2 in its height direction and communicate with respective ink reservoirs 14 (described later). The attachment-face-side end portions of the ink supply passages 13 penetrate through connection ports 16, respectively, that project from the attachment face.

The connection board 5 is a wiring board on which an electric wiring for various signals that come from a controller (not shown) and are to be supplied to the recording head 1 is formed and to which a connector is attached to which a signal cable can be connected. The connection board 5 is placed on the attachment face of the case 2, and the electric wirings of the flexible cables 9 are connected to the connection board 5 by soldering or the like.

The supply needle unit 6 is a unit to which ink cartridges (not shown) are to be connected. The supply needle unit 6 is generally composed of a needle holder 18, ink supply needles 19, and filters 20.

Each ink supply needle 19 is a portion to be inserted into an ink cartridge and serves to introduce the ink stored in the ink cartridge. The tip end portion of the ink supply needle 19 is pointed like a cone so as to be easily inserted into an ink cartridge. The tip end portion is formed with plural ink introduction holes that communicate with the inside and the outside of the ink supply needle 19.

The needle holder 18 is a member to which the ink supply needles 19 are attached. Two pedestals 21 to which the base portions of the ink supply needles 19 are tied up are formed on the top face of the needle holder 18. The pedestals 21 have a circular shape that conforms to a bottom shape of the ink supply needles 19. Ink ejection holes 22 are formed approximately at the centers of bottom portions of the pedestals 21, respectively, so as to penetrate through the needle holder 18 in its thickness direction. Flanges of the needle holder 18 project sideways.

The filters 20 are members for preventing passage of foreign matter in ink such as dust and burrs that were produced at the time of molding, and are fine-mesh metal nets, for example. The filters 20 are bonded to filter holding grooves that are formed in the pedestals 21, respectively.

As shown in FIG. 1, the supply needle unit 6 is placed on the attachment face of the case 2. In a state that the supply needle unit 6 is thus placed, the ink ejection holes 22 of the supply needle unit 6 and the holes of the connection ports 16 of the case 2 communicate with each other via packings 23, respectively, in a liquid-tight manner.

Next, the flow passage unit 4 will be described. The flow passage unit 4 is configured in such a manner that a nozzle plate 31 is joined to one face of a chamber formation plate 30 and an elastic plate 32, which is a kind of sealing plate, is joined to the other face of the chamber formation plate 30.

Figure 2:
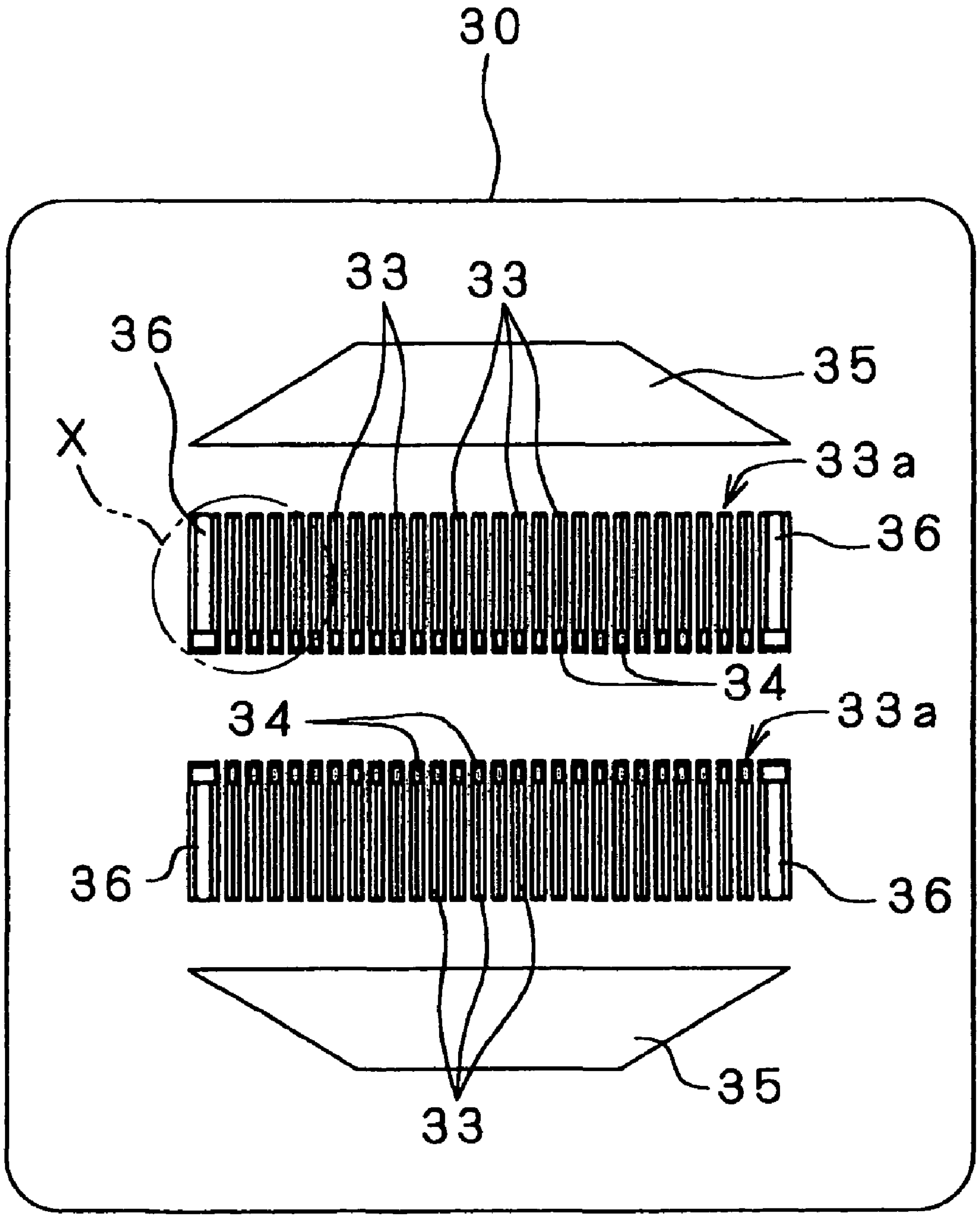
FIG. 2 is a plan view of a chamber formation plate.
Figure 3A:
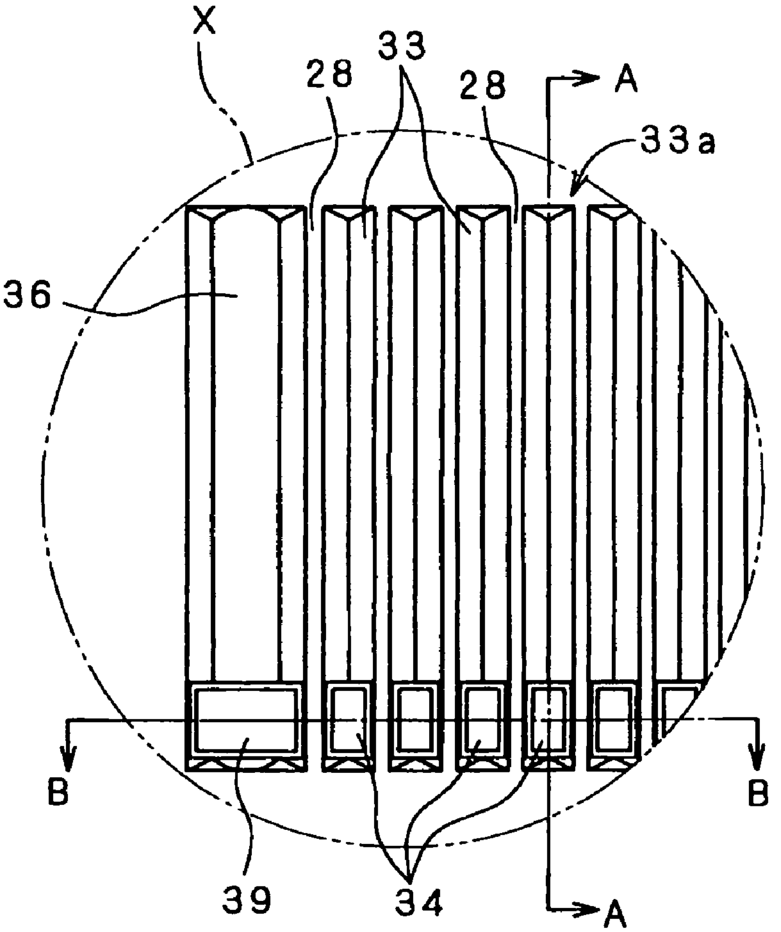
FIG. 3A is an enlarged view of a part X of the chamber formation plate in FIG. 2.
Figure 3B:
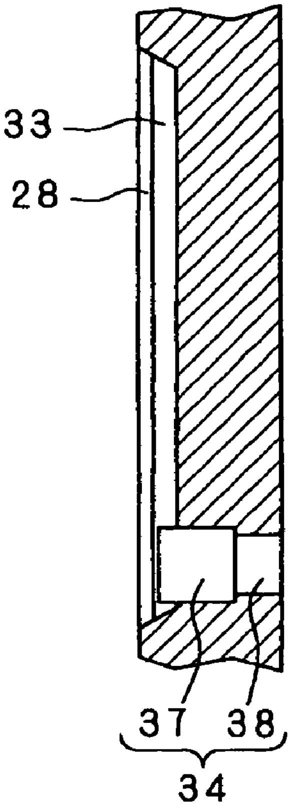
FIG. 3B is a sectional view taken along a line A-A in FIG. 3A.
Figure 3C:
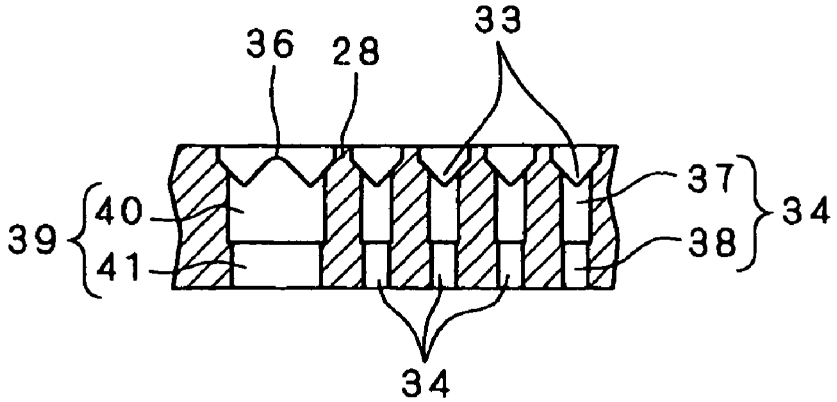
FIG. 3C is a sectional view taken along a line B-B in FIG. 3A.

As shown in FIGS. 2 through 3C, the chamber formation plate 30 is a metal plate-shaped member that is formed with sets of a large number of elongated recesses 33 that are arrayed so as to be parallel with each other, communication holes 34 that are provided in the respective elongated recesses 33, and reservoir spaces 35 in which the ink reservoirs 14 are formed. Each reservoir space 35 extends generally parallel with the arrayed direction of the associated elongated recesses 33 and penetrates through the chamber formation plate 30 in its thickness direction. As shown in FIG. 2, each reservoir space 35 has a long and narrow shape extending in the arrayed direction of the associated elongated recesses 33. In this embodiment, the chamber formation plate 30 is formed by performing plastic working on a nickel substrate having a thickness of 0.35 mm.

The chamber formation plate 30 may be made of a metal other than nickel as long as it satisfies requirements relating to the linear expansion coefficient, rust resistance, malleability, etc.

As shown in FIGS. 3A to 3C in an enlarged manner, the elongated recesses 33 to serve as pressure generating chambers 29 are linear grooves. In this embodiment, 180 grooves each measuring about 0.1 mm in width, about 1.5 mm in length, and about 0.1 mm in depth are arrayed in the groove width direction.

The bottom face of each elongated recess 33 decreases in width as the position goes deeper; that is, the bottom face assumes a V-shape. The reason why the bottom face assumes a V-shape is to increase the rigidity of partitions 28 that divide the adjoining pressure generating chambers 29. That is, the bottom faces assuming a V-shape increase the thickness of the bottom portions of the partitions 28 and hence increase the rigidity of the partitions 28. With the highly rigid partitions 28, each pressure generating chamber 29 is less prone to be influenced by pressure variations in the adjacent pressure generating chambers 29. That is, variations in ink pressure are less prone to be transmitted from the adjacent pressure generating chambers 29 to each pressure generating chamber 29. Further, the bottom faces assuming a V-shape allow the elongated recesses 33 to be formed with high dimensional accuracy by plastic working. The angle of the V-shape is set according to working conditions and is set to about 90°, for example. Since the top portions of the partitions 28 are very thin, a necessary capacity can be secured even if the pressure generating chambers 29 are formed densely.

Both end portions, in the longitudinal direction, of each elongated recess 33 of this example are inclined so that their interval decreases as the position goes deeper, that is, they have chamfering shapes. This is also to form the elongated recesses 33 with high dimensional accuracy by plastic working.

One dummy recess 36 that is wider than the elongated recesses 33 is formed adjacent to each of the two end elongated recesses 33. The dummy recesses 36 are elongated recesses to serve as dummy pressure generating chambers that are not used to eject of ink droplets. Each dummy recess 36 of this embodiment is a groove measuring about 0.2 mm in width, about 1.5 mm in length, and about 0.1 mm in depth. The bottom face of each dummy recess 36 assumes a W-shape. This is also to increase the rigidity of the partitions 28 and to form the dummy recesses 36 with high dimensional accuracy by plastic working.

The elongated recesses 33 and the pair of dummy recesses 36 constitute an array 33*a* of elongated recesses. In this embodiment, two arrays 33*a* are formed parallel with each other. That is, two sets of an array 33*a* of elongated recesses and a reservoir space 35 are provided.

The communication holes 34 are through-holes that penetrate through the chamber formation plate 30 in its thickness direction from one ends of the elongated recesses 33, respectively. The communication holes 34 are formed for the respective elongated recesses 33. Each array 33*a* of elongated recesses has 180 communication holes 34. Each of the communication holes 34 of this embodiment has rectangular openings and consists of a first communication hole 37 that extends from the elongated recess 33 to an intermediate position in the thickness direction of the chamber formation plate 30 and a second communication hole 38 that extends from the face opposite to the elongated recess 33 to the intermediate position in the thickness direction.

The first communication hole 37 and the second communication hole 38 have different cross sections; the inner dimensions of the second communication hole 38 are slightly smaller than those of the first communication hole 37. This results from the fact that the communication holes 34 are formed by press working. More specifically, since the chamber formation plate 30 is formed by working on a thick nickel plate having a thickness of 0.35 mm, the communication holes 34 are as long as 0.25 mm or more even if the depth of the elongated recesses 33 is deducted. Since the width of the communication holes 34 needs to be smaller than the groove width of the elongated recesses 33, it is set smaller than 0.1 mm. Therefore, if it is attempted to punch out the communication holes 34 by one stroke, the male die (punches) would buckle or encounter like trouble because of the aspect ratio. In view of this, in this example, each communication holes 34 is formed by two strokes. A first communication hole 37 is formed by the first stroke to an intermediate position in the thickness direction and a second communication hole 38 is formed by the second stroke. A working procedure for forming the communication holes 34 will be described later.

Dummy communication holes 39 are formed for the respective dummy recesses 36. Like each communication hole 34, each dummy communication hole 39 consists of a first dummy communication hole 40 and a second dummy communication hole 41. The inner dimensions of the second dummy communication hole 41 are smaller than those of the first dummy communication hole 40.

In this example, the communication holes 34 and the dummy communication holes 39 are through-holes having rectangular openings. However, they may be through-holes having circular openings, for example.

Next, the elastic plate 32 will be described. For example, the elastic plate 32, which is a kind of sealing plate, is formed by working on a double-layer composite material (a kind of metal material of the invention) in which an elastic film 43 is laid on a support plate 42. In this embodiment, a stainless steel plate is used as the support plate 42 and a PPS (polyphenylene sulfide) film is used as the elastic film 43.

As shown in FIG. 1, a diaphragm portion 44 defines part of each pressure generating chamber 29. That is, the diaphragm portion 44 closes the opening of the elongated recess 33 and thereby defines the pressure generating chamber 29 together with the elongated recess 33. The diaphragm portions 44 each have a long and narrow shape that conforms to the shape of the elongated recesses 33, and are formed in the respective sealing regions for sealing of the elongated recesses 33, that is, formed for the respective elongated recesses 33. More specifically, the width of the diaphragm portions 44 is set approximately equal to the groove width of the elongated recesses 33 and the length of the diaphragm portions 44 is set somewhat shorter than that of the elongated recesses 33. In this embodiment, the length of the diaphragm portions 44 is set at about ⅔ of the length of the elongated recesses 33. As for the positions of formation of the diaphragm portions 44, as shown in FIG. 1, one end of each diaphragm portion 44 is made flush with the corresponding end (i.e., the end on the side of the communication hole 34) of the associated elongated recess 33.

Each diaphragm portion 44 is formed by, for example, etching away an annular portion of the support plate 42 in a region corresponding to the elongated recess 33, leaving only the elastic film 43 there. An island 47 is formed inside the ring. The island 47 is a portion to which the tip end face of the associated piezoelectric vibrator 10 is joined.

Ink supply holes 45 are holes that connect the pressure generating chambers 29 to the common ink room 14 and that penetrate through the elastic plate 32 in its thickness direction. Like the diaphragm portions 44, the ink supply holes 45 are formed at positions corresponding to the respective elongated recesses 33, that is, formed for the respective elongated recesses 33. As shown in FIG. 1, the ink supply holes 45 are formed at positions corresponding to the ends of the elongated recesses 33 opposite to the communication holes 34, respectively. The diameter of the ink supply holes 45 is set sufficiently smaller than the groove width of the elongated recesses 33. In this embodiment, the ink supply holes 45 are very narrow through-holes having a diameter of 23 μm.

The support plate 42 and the elastic film 43 which constitute the elastic plate 32 are not limited to the ones in the above example. For example, the elastic film 43 may be a polyimide film.

Next, the nozzle plate 31 will be described. The nozzle plate 31 is a metal plate-shaped member that is formed with arrays of nozzle orifices 48. In this embodiment, the nozzle plate 31 is a stainless steel plate and is formed with plural nozzle orifices 48 with a pitch corresponding to a dot forming density. In this embodiment, two nozzle arrays are formed parallel with each other, each array consisting of 180 nozzle orifices 48 in total. When the nozzle plate 31 is joined to the face of the chamber formation plate 30 that is opposite to the elastic plate 32, the nozzle orifices 48 communicate with the respective communication holes 34.

When the elastic plate 32 is joined to the face of the chamber formation plate 30 that is formed with the elongated recesses 33, the diaphragm portions 44 close the openings of the elongated recesses 33 and the pressure generating chambers 29 are thereby defined. Likewise, the openings of the dummy recesses 36 are closed and the dummy pressure generating chambers are defined. When the nozzle plate 31 is joined to the other face of the chamber formation plate 30, nozzle orifices 48 communicate with the respective communication holes 34. If a piezoelectric vibrator 10 that is joined to the island 47 expands or contracts in this state, the portion of the elastic film 43 around the island 47 is deformed and the island 47 is pushed toward or pulled away from the elongated recess 33. As the elastic film 43 is deformed in this manner, the pressure generating chamber 29 is expanded or contracted, whereby the ink in the pressure generating chamber 29 is given a pressure variation.

The above-configured recording head 1 has common ink flow passages that extend from the ink supply needles 19 to the ink reservoirs 14, respectively, and individual ink flow passages each set of which extends from the associated ink reservoir 14 to the nozzle orifices 48 past the pressure generating chambers 29, respectively. Ink that is stored in each ink cartridge is introduced into the common ink flow passage via the ink supply needle 19 and then stored in the ink reservoir 14. Ink that is stored in the ink reservoir 14 is introduced to the nozzle orifices 48 via the individual ink flow passages and then ejected from the nozzle orifices 48.

For example, when a piezoelectric vibrator 10 is contracted, the diaphragm portion 44 is pulled toward the vibrator unit 3 and the pressure generating chamber 29 is thereby expanded. Since a negative pressure occurs in the pressure generating chamber 29 because of its expansion, ink flows from the ink reservoir 14 to the pressure generating chamber 29 past the ink supply hole 45. When the piezoelectric vibrator 10 is thereafter expanded, the diaphragm portion 44 is pushed toward the chamber formation plate 30 and the pressure generating chamber 29 is thereby contracted. The ink pressure in the pressure generating chamber 29 increases because of its contraction, whereby an ink droplet is ejected from the corresponding nozzle orifice 48.

In this recording head 1, the bottom faces of the pressure generating chambers 29 (i.e., elongated recess 33) are dented in a V-shape. Therefore, the bottom portion of each partition 28 that defines the adjacent pressure generating chambers 29 is thicker than its top portion. This structure makes the rigidity of the partitions 28 higher than in the conventional case. Therefore, even if the ink pressure in a pressure generating chamber 29 varies when an ink droplet is ejected, the pressure variation is less prone to be transmitted to the adjacent pressure generating chambers 29. As a result, the so-called crosstalk can be prevented and the eject of ink droplets can be stabilized.

Next, a manufacturing method of the recording head 1 will be described. In this manufacturing method, manufacturing dies are mainly used for plastic working on the chamber formation plate 30, the following description will be focused on a manufacturing process of the chamber formation plate 30 that uses the manufacturing dies. The chamber formation plate 30 is formed by forging that uses progressive dies. As mentioned above, a strip as a material plate of the chamber formation plate 30 is made of nickel.

The manufacturing process of the chamber formation plate 30 consists of a process for forming the elongated recesses 33 and a process for forming the communication holes 34 and is executed by using a plastic working press machine that is mounted with progressive dies.

Figure 4:
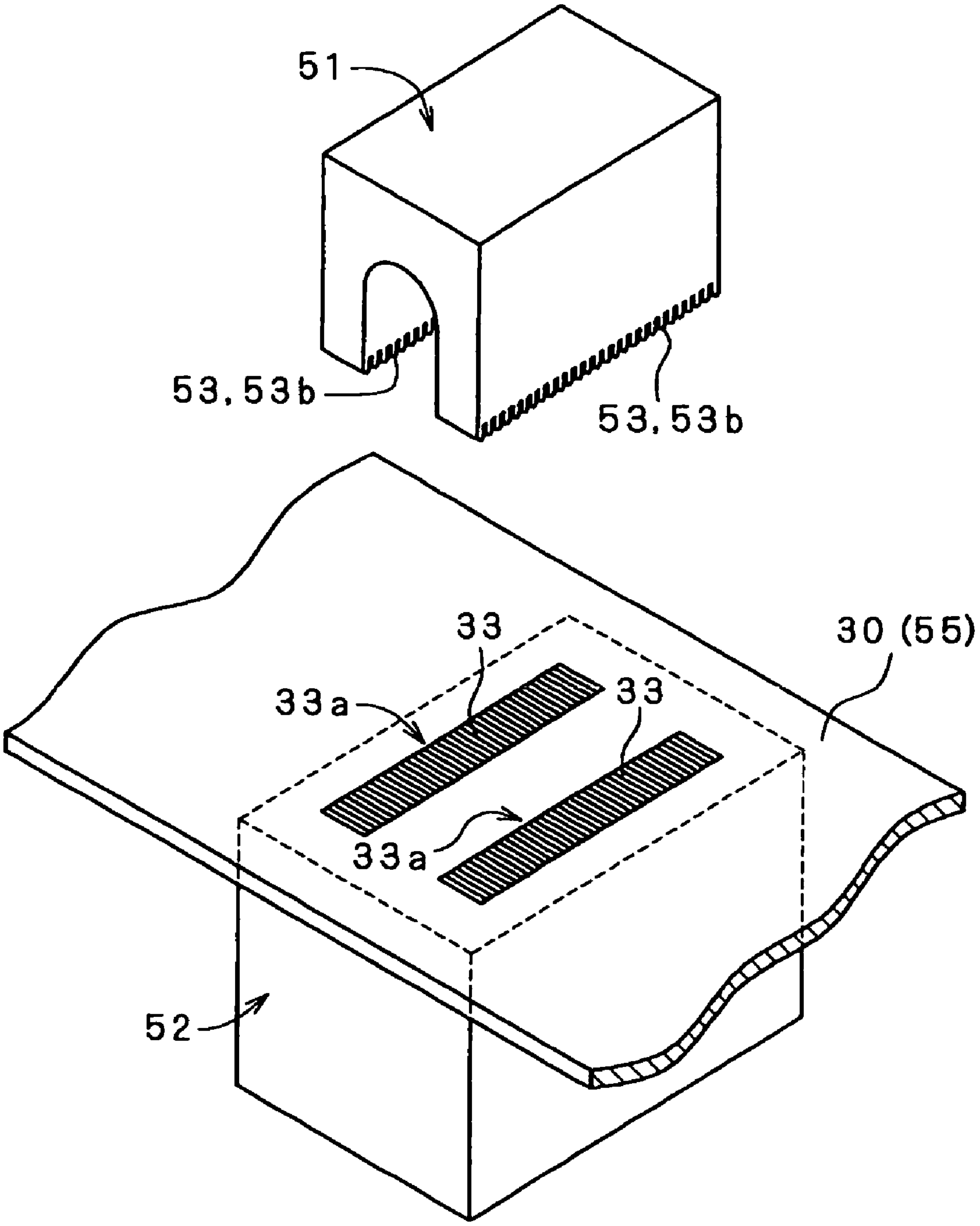
FIG. 4 is a perspective view showing a relationship between a material plate and dies.
Figure 5:
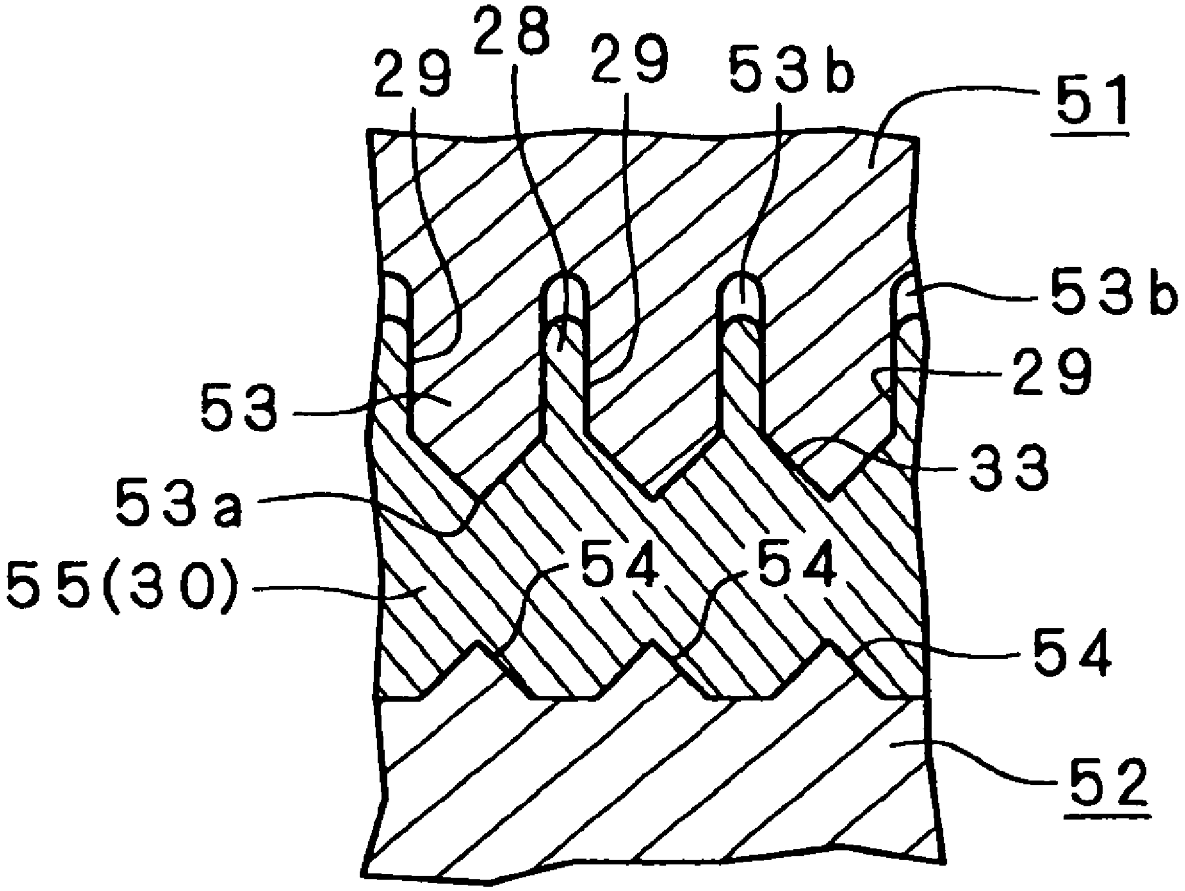
FIG. 5 is a sectional view showing a state that the chamber formation plate is being press-formed.

The process for forming the elongated recesses 33 uses a male die 51 and a female die 52 shown in FIGS. 4 and 5. The male die 51 is a die for forming the elongated recesses 33. Projections 53 for forming the elongated recesses 33 are arrayed on the male die 51 in the same number as the number of elongated recesses 33. Dummy projections (not shown) for forming the dummy recesses 36 are provided adjacent to the projections 53 that are located at both ends in the arrayed direction. A tip end portion 53*a* of each projection 53 is tapered into a mountain-shaped shape. For example, as shown in FIG. 5, each projection 53 is chamfered so as to form an angle of about 450 with the center line in the width direction. That is, a wedge-shaped tip end portion 53*a* is formed by slant faces of the projection 53. As a result, each projection 53 is pointed like a V-shape when viewed in the longitudinal direction.

Plural ribs 54 are formed on the top face of the female die 52. The ribs 54 are indispensable for formation of the partitions 28 each of which defines the adjacent pressure generating chambers 29, and the ribs 54 are located at such positions as to be opposed to the corresponding projections 53.

In process for forming the elongated recesses 33, as shown in FIG. 4, a strip 55 as a material plate of the chamber formation plate 30 is first placed on the top face of the female die 52, and the male die 51 is disposed over the strip 55. Then, as shown in FIG. 5, the male die 51 descends, whereby the tip end portions 53*a* of the projections 53 are dug into the strip 55. Here, since the tip end portions 53*a* of the projections 53 are sharpened in a V-shape, the tip end portions 53*a* can reliably be dug into the strip 55 without causing buckling of the projections 53.

As the projections 53 are dug, parts of the strip 55 flow to form elongated recesses 33. Since the tip end portions 53*a* of the projections 53 are sharpened in a V-shape, even minute elongated recesses 33 can be formed with high dimensional accuracy. That is, parts of the strip 55 that are pressed by the tip end portions 53*a* flow smoothly and hence elongated recesses 33 are shaped so as to conform to the projections 53. Incidentally, the material that flows being pressed aside by the tip end portions 53*a* goes into gaps 53*b* between the projections 53, whereby partitions 28 are formed.

When pressed by the projections 53, parts of the strip 55 rise into the gaps 53*b* between the adjoining projections 53. Incidentally, since as mentioned above the ribs 54 are opposed to the corresponding projections 53, the material is pressed most strongly between the ribs 54 and the projections 53. As a result, a plastic flow of the material thus pressed strongly is caused positively toward the gaps 53*b*, whereby the material efficiently flows plastically into the spaces (gaps 53*b*) between the projections 53: tall partitions 28 can be formed.

Next, a manufacturing method of a manufacturing die for the liquid ejecting head according to the invention will be described with reference to FIGS. 6 through 12. Dies having various shapes are used as a manufacturing die for the liquid ejecting head. The following description will be directed to an exemplary die that is the male die 51 for formation of the elongated recesses 33 that is shown in FIGS. 4 and 5.

Figure 6:
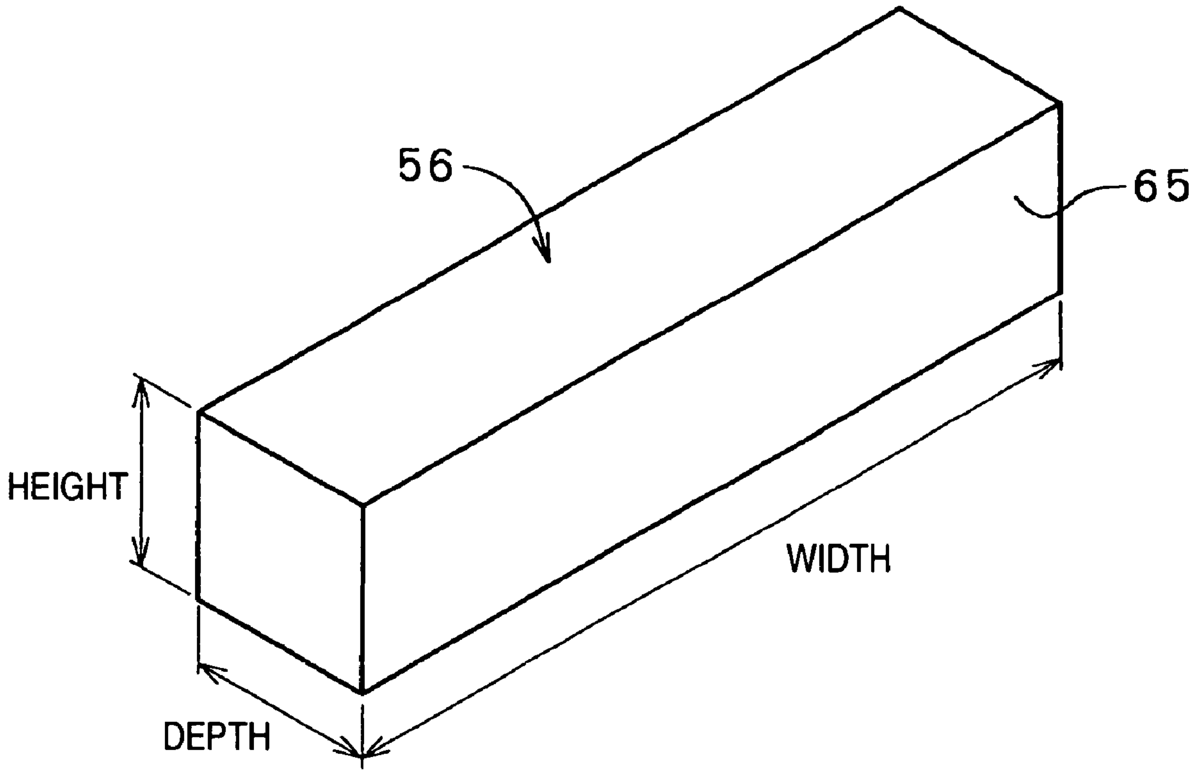
FIG. 6 is a perspective view of a material block.
Figure 7:
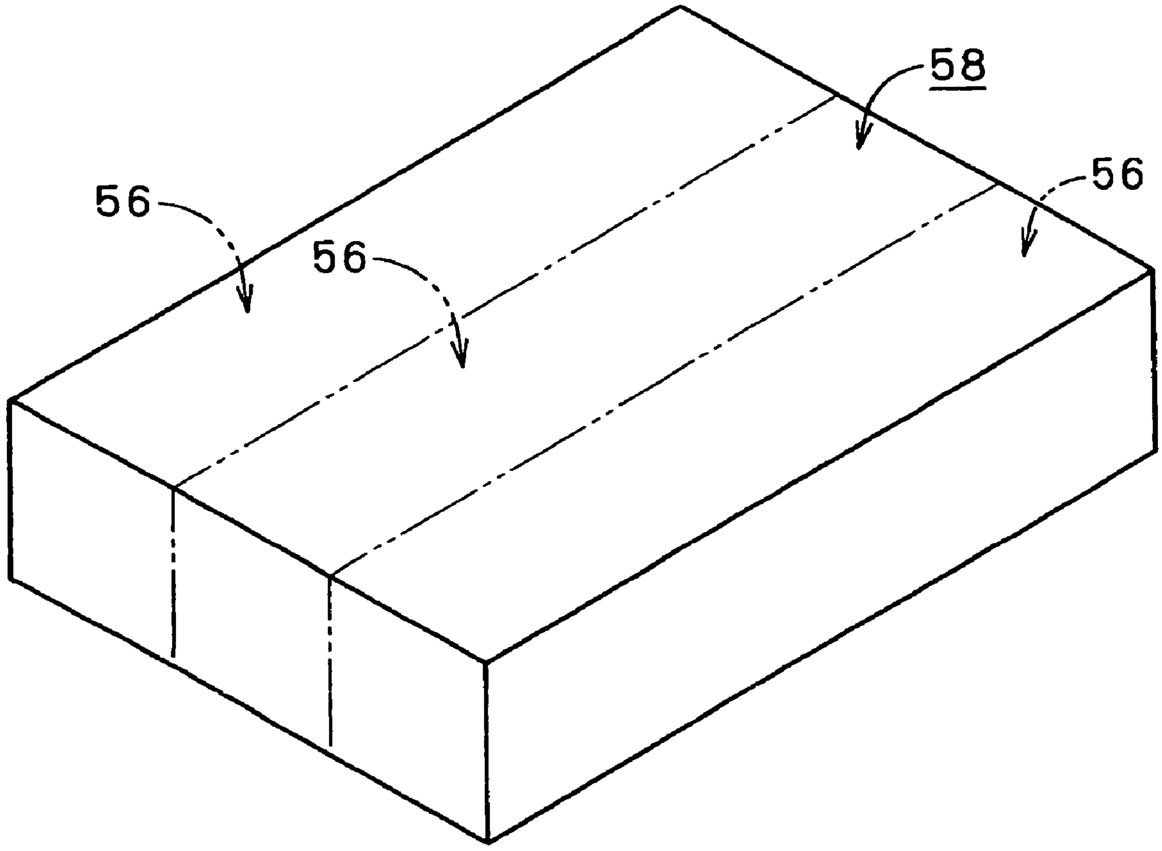
FIG. 7 is a perspective view of a parent material block.
Figure 9:
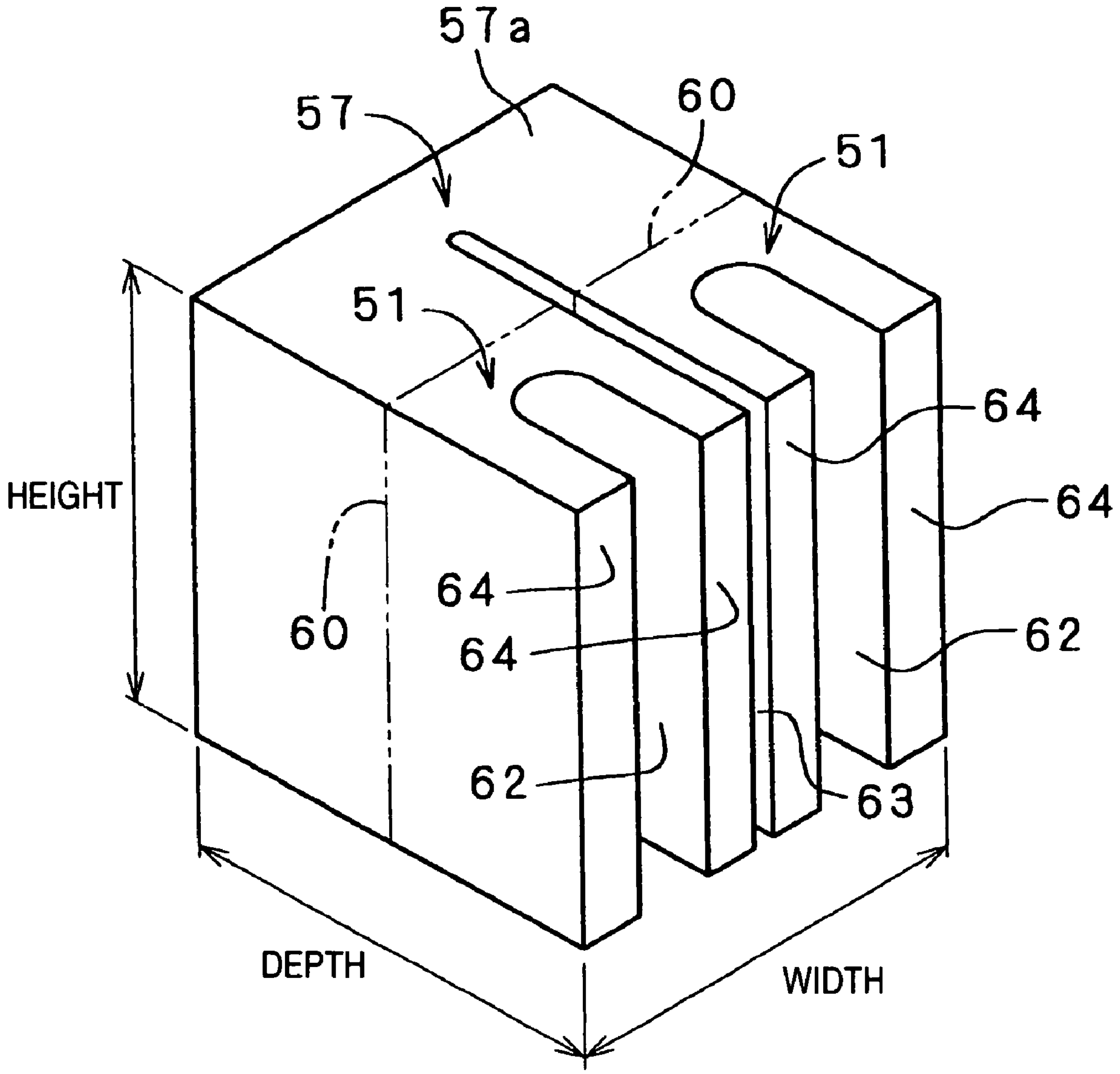
FIG. 9 is a perspective view of a cut-out, dual manufacturing die.

As shown in FIG. 6, a material block 56 generally assumes a rectangular parallelepiped shape and measures 30 mm in the depth direction, 100 mm in the width direction, and 30 mm in the height direction. As shown in FIG. 9, the above depth direction, width direction, and height direction correspond to a depth direction, a width direction, and a height direction of a cut-out, dual manufacturing die 57, respectively. The material block 56 is formed by producing an ingot by subjecting a metal powder to hot isostatic press sintering (HIP sintering)

and then cutting the ingot into parts having prescribed dimensions. FIG. 7 shows how a large parent material block that has been cut out from an ingot is further divided into three material blocks 56.

After cut out in a cutting-out process (described later), the dual manufacturing die 57 having the shape of FIG. 9 is cut along a division line 60, whereby a set of two male dies 51 each being shown in FIG. 4 is obtained. In the following, the male die 51 will be referred to as "manufacturing die 51."

Figure 8:
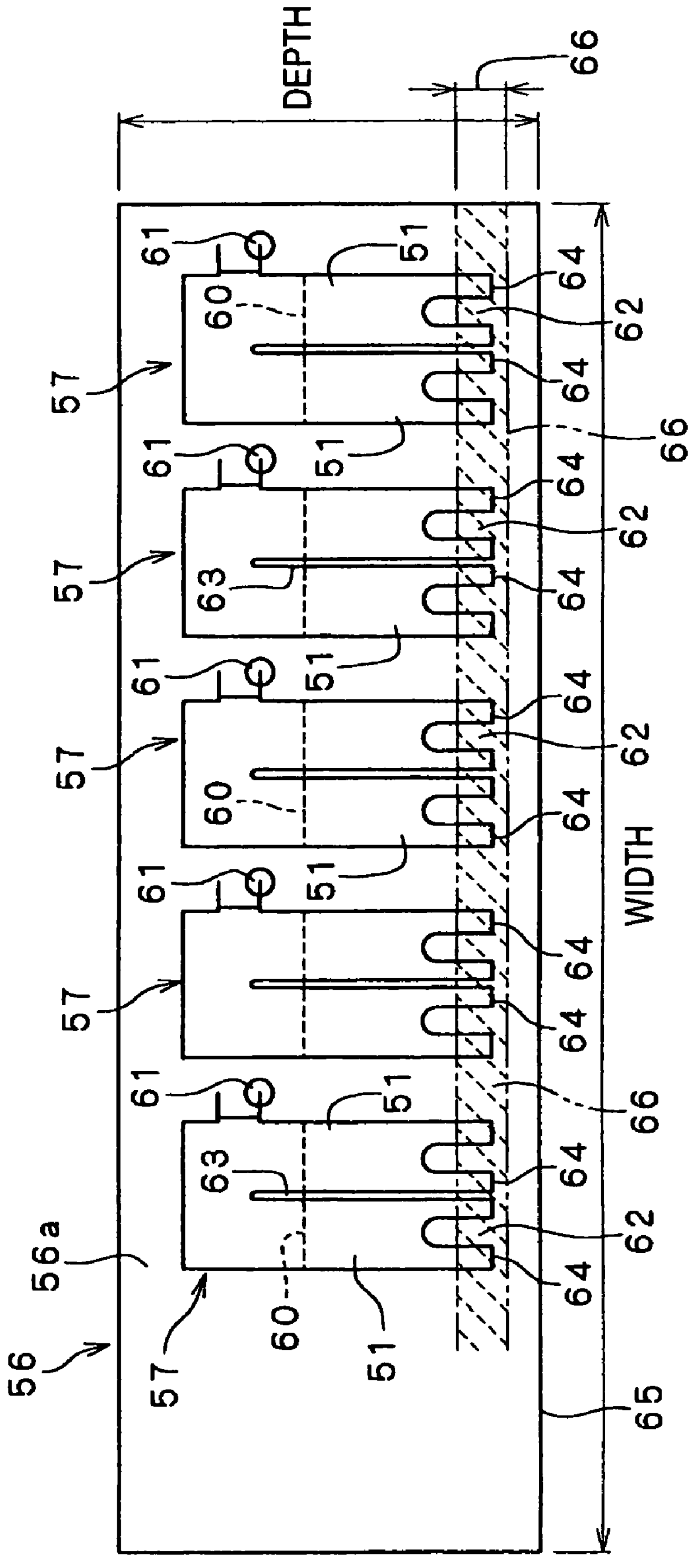
FIG. 8 is a plan view showing how dual manufacturing dies are cut out.

In the process of cutting out dual manufacturing dies 57, electric discharge machining is performed as shown in FIG. 8 in which top faces 57*a* and bottom faces 57*b* of dual manufacturing dies 57 correspond to top faces 56*a* and bottom faces 56*b* of the manufacturing block 56, respectively. In FIG. 8, reference numeral 61 denotes insertion holes into which a wire of electric discharge machining is to be inserted so as to penetrate in the direction perpendicular to the paper face of FIG. 8. The material block 56 is cut along the outline of each dual manufacturing die 57 by moving the wire. As a result of the material blocks 56 being cut along the above outline, forked portions 62 of respective manufacturing dies 51 and a division slit 63 are formed. After the cutting-out process, excess materials on the side of the top face 57*a* and the bottom face 57*b* are removed by grinding or the like. Working members 53 and 53*b* are formed by forming projections 53 and gaps 53*b* as shown in FIGS. 4 and 5 on tip end faces 64 of each forked portion 62 in another process. The tip end faces 64 of each manufacturing die 51 are made flush with each other. The working members are given the same reference symbols 53 and 53*b* as the projections 53 and the gaps 53*b* because the projections 53 and the gaps 53*b* perform a forging work.

The material block 56 has a flat end face 65, and the distances between the end face 65 and the tip end faces 64 of the manufacturing dies 51 that are to be formed with the working members 53 and 53*b* are approximately uniform as shown in FIG. 8. A material 66 which occupies a region to be the tip end faces 64 of the working members 53 and 53*b* extends perpendicularly to the paper face of FIG. 8 and parallel with the end face 65. The material 66, that is, the working members 53 and 53*b*, is located close to and extends parallel with the end face 65.

Figure 10:
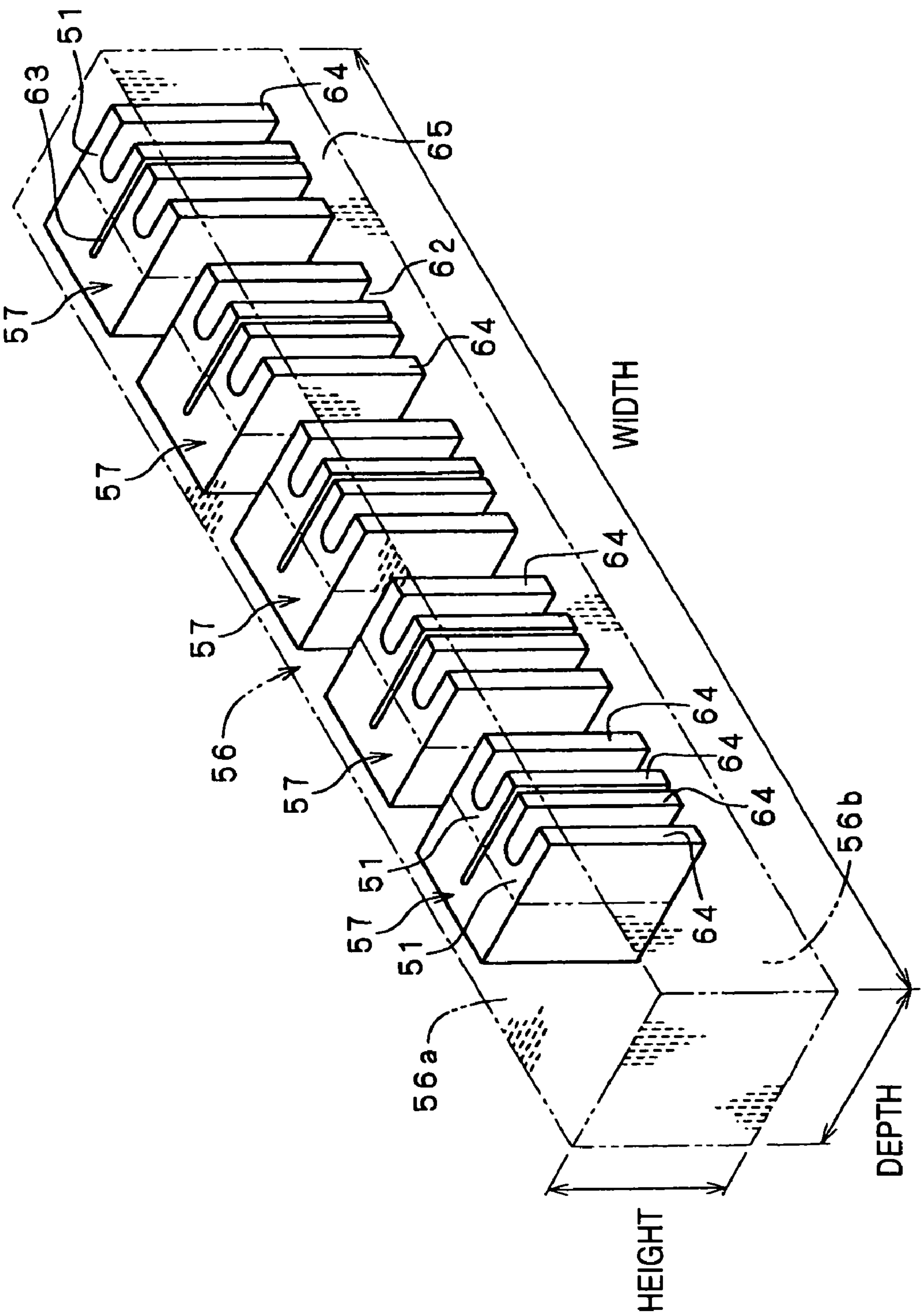
FIG. 10 is a perspective view showing how manufacturing dies are taken out of the material block in a single row.

Two arrays 33*a* of elongated recesses (in each array, a large number of elongated recesses 33 are arrayed as shown in FIG. 4) are formed parallel with each other by the working members 53 and 53*b*. Therefore, the tip end faces 64 to be formed with the working members 53 and 53*b* have a long and narrow shape and the longitudinal direction of the tip end faces 64 is the same as the height direction of the material block 56 as shown in FIGS. 9 and 10. The above-oriented tip end faces 64 approximately exist in a single imaginary plane, which exists in the region of the material 66. As described above, the region of the material 66 is located close to the end face 65 of the material block 56.

As shown in FIGS. 8 and 10, only a single array of plural dual manufacturing dies 57 are cut out from the single material block 56.

Figure 11:
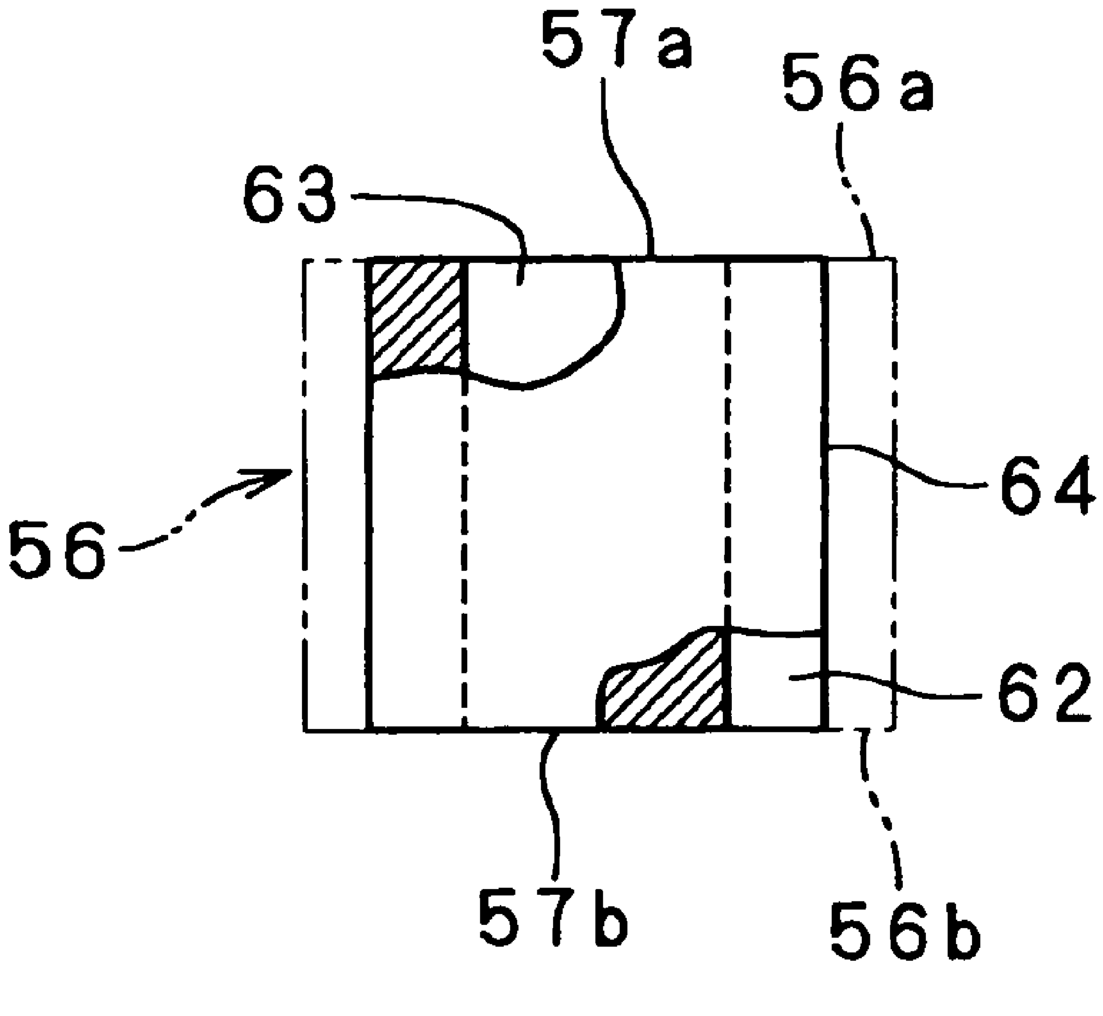
FIG. 11 is a sectional view showing a positional relationship between the material block and each manufacturing die.

To minimize the height dimension of the material block 56, as shown in FIG. 11, parts of the top face 56*a* and the bottom face 56*b* that are outer faces of the material block 56 may be made the top faces 57*a* and the bottom faces 57*b* of the respective dual manufacturing dies 57. The top faces 57*a* and the bottom faces 57*b* are outer faces of the dual manufacturing dies 57 that are defined by the vertical lines and the horizontal lines (extending in the depth direction and the width direction of the material block 56, respectively).

Next, formation of a metal material of the material block 56 and thermal refining such as quenching/tempering to be performed thereon will be described.

The material block 56 was one that was obtained by solidifying a metal powder by hot isostatic press sintering (HIP sintering), and the metal powder used was a powder obtained by nitriding high-speed tool steel that is special steel. The metal powder was a nitride powder of high-speed tool steel, KHA30N of Kobe Steel, Ltd. It has a chemical composition (weight %) of C: 0.97%, Cr: 4.04%, Mo: 6.21%, W: 6.35%, V: 3.58%, Co., 5.12%, N: 0.62%, and Fe: remainder. An ingot was produced by heat-sintering the whole of the above nitride powder of high-speed tool steel while pressing it in an isostatic manner, and was cut into long and narrow material blocks 56 of 30 mm in vertical length, 100 mm in horizontal length, and 30 mm in height.

Each material block 56 was subjected to vacuum quenching in which it was kept at 1,180° C. for 3 minutes in vacuum and then air-cooled. Subsequently, the material block 56 was subjected to a sub-zero process (deep cooling process) once by immersing it in liquid nitrogen, whereby the amount of residual austenite was reduced. Then, the material block 56 was subjected three times to a tempering cycle in which it was kept at 540° C. for 1.5 hours. As shown in FIG. 8, five manufacturing dies 51 were cut out from the resulting material block 56 by electric discharge machining. And working members 53 and 53*b* were formed by electric discharge machining. Where high mass-productivity is not required, salt both quenching (oil cooling) may be performed instead of the vacuum quenching.

Comparative Example 1 is different from the above Example only in that the dimensions of the material block were changed to 150 mm (vertical length), 150 mm (horizontal length), and 30 mm (height). Manufacturing dies 51 were cut out in five rows and working members 53 and 53*b* were formed. Comparative Example 2 is different from the above Example only in that the dimensions of the material block were changed to 100 mm (vertical length), 100 mm (horizontal length), and 30 mm (height). Three arrays of manufacturing dies 51 were cut out and working members 53 and 53*b* were formed.

In the above Example of the invention, when press forming was performed on material plates 55 (chamber formation plates 30) using each manufacturing die 51, elongated recesses 33, partitions 28, etc. having a normal shape were formed with sufficient accuracy in 1,747 times of press forming. In contrast, a satisfactory result was obtained in 966 times in the case of Comparative Example 1 and 959 times in Comparative Example 2. It is apparent that the above Example is improved by a factor of about 1.8 in terms of the number of times of pressing.

As shown in FIG. 13, hardness values at five positions of test pieces of Nos. 1, 2, and 3 taken from the above Example range between 64.5 and 65.3 (HRC) and are satisfactory for the manufacturing dies 51. As shown in FIG. 14, the amount of residual austenite (γ-Fe) was 1.7% (volume %) even in the largest case, which means that martensite (α-Fe) is the main structure. Assuming minute sphere shapes, carbides $M_6C$ and MC are effective in increasing the hardness.

Figure 12:
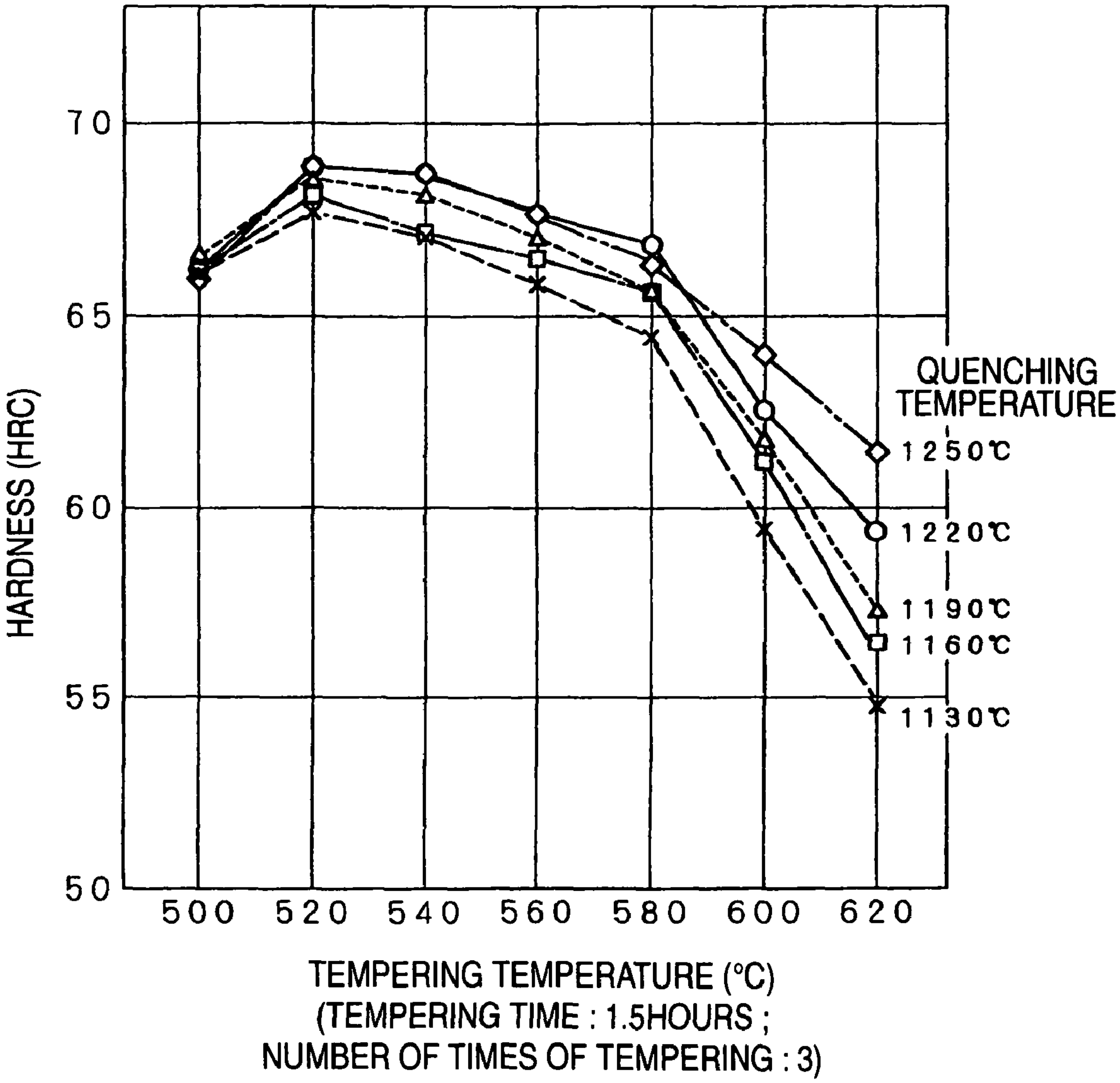
FIG. 12 is a graph showing a relationship between the tempering temperature and the hardness.

FIG. 12 shows a relationship among the quenching temperature (° C.), the tempering temperature (° C.), and the hardness (HRC). In the tempering temperature range of 520 to 540° C. where high tempering hardness can be obtained, highest hardness is obtained when the quenching temperature is 1,190° C. or more. However, the deflective strength tends to be low at such a hardness level. In the above Example, reduction in deflective strength is avoided by employing 1,180° C. as a quenching temperature.

In the above Example, numbers close to the above-mentioned number (1,747) of times of press forming can be obtained even if the quenching temperature is set in a range of 1,130 to 1,180° C. and the tempering temperature is set in a range of 520 to 580° C.

The transformation from residual austenite to martensite is promoted by the sub-zero process that is executed in the thermal refining in the above Example. Therefore, almost no transformation from residual austenite to martensite occurs with age and material expansion due to such transformation can be prevented. Best manufacturing dies can be obtained in which almost no variations occur with age in the dimensions of the elongated recesses 33 etc. that are formed by precision plastic working.

The above embodiment provides the following advantages.

The material block 56 can be subjected to the thermal refining in which the cooling rates of the future working members 53 and 53*b* are made as uniform as possible. As a result, the unevenness in metal structure can be made to such a level that substantially no problems occur, and metal structure that is most suitable for increase in die durability etc. can be distributed uniformly in the working members 53 and 53*b*. Therefore, the manufacturing dies 51 that are cut out from the material block 56 can be given sufficient durability to withstand physical loads that are imposed on the working members 53 and 53*b* at the time of plastic working.

Plural manufacturing dies 51 are cut out from the material block 56 in a state that the parts to be the working members 53 and 53*b* are close to and parallel with the end face 65. Therefore, a material region that has been thermally refined at a high cooling rate in the vicinity of the end face 65 is becomes a harder material such as a material having martensitic structure and is used for formation of the working members 53 and 53*b*. This makes it possible to make the portions strongest that will receive highest physical loads at the time of plastic working.

The material 66 of the material block 56 to be the working members 53 and 53*b* are arranged is located approximately parallel with the end face 65, and is converted so as to have metal structure that is suitable for the functions of the working members 53 and 53*b* by subjecting the material block 56 to thermal refining in advance. Strengthened by the thermal refining, the material 66 that is located parallel with the end face 65 becomes a material region that is uniform and high in strength. The metal structure of the working members 53 and 53*b* that are formed from the material region having such properties exhibits its highest strength at the time of plastic working and greatly increases the durability of the manufacturing die 51.

Since only a single array of the working members 53 and 53*b* are arranged in each of the lateral and longitudinal directions in each manufacturing die 51, an array of the manufacturing dies 51 are cut out from the material block 56 that is approximately uniform in metal structure in its entirety. Therefore, the metal structure distribution of each manufacturing die 51 is superior, that is, low in the degree of unevenness and the working members 53 and 53*b* can be formed so as to be best in metal structure.

Where the top faces 57*a* and the bottom faces 57*b* of the manufacturing dies 51 that are defined by the above-mentioned vertical lines and horizontal lines are made parts of the top face 56*a* and the bottom face 56*b* of the material block 56, the top face 57*a* and the bottom face 57*b* of each manufacturing die 51 can be obtained directly from the top face 56*a* and the bottom face 56*b* of the material block 56 at the moment when it is cut out. This makes it unnecessary to perform working of finishing the outward form of each manufacturing die 51. Even in the case where the working of finishing the outward form of each manufacturing die 51, the finishing margins can be made very small, which is effective in decreasing the amount of waste material and the number of working steps. Further, since only one die can be cut out in the height direction of the material block 56, the structure unevenness among cut-out dies 51 are low and hence they are uniform in mechanical characteristics.

The material block 56 is formed by subjecting metal powder to hot isostatic press sintering, that is, the whole of the metal powder is heat-sintered while being pressed in an isostatic manner. Therefore, the material block 56 is solidified uniformly at a high density, which is effective in manufacture strong manufacturing dies 51. Further, since the structure of the thus-obtained material block 56 is dense and uniform, the working members 53 and 53*b* can be made uniform in strength, which is advantageous to very fine plastic working for forming the pressure generating chambers 29 of the ink jet head 1, for example.

Since the above metal powder is nitrided special steel, the entire material block 56 is made from the metal powder of the nitrided special steel. Each of the material block 56 and the manufacturing die 51 has substantially no gradation in nitrogen density and exhibits uniform mechanical characteristics. Therefore, the working members 53 and 53*b* can be made uniform in strength, which is advantageous to very fine plastic working for forming the pressure generating chambers 29 of the ink jet head 1, for example.

Since the above metal powder is nitrided high-speed tool steel, advantages in strength, abrasion resistance, etc. of the nitrided high-speed tool steel which is less prone to seizure and superior in chipping resistance are added. Therefore, the durability etc. of the manufacturing die 51 are increased further. And an event can be prevented that wear, cracks, or the like occurs early in the working members 53 and 53*b* and lowers the accuracy of the shape of an ink jet head produced by working or requires early replacement of the die.

The main metal structure of at least the material 66 in the material block 56 is martensite and the amount of residual austenite is 2% or less in terms of capacity ratio. The cooling rate of quenching can be made uniform almost in the entire material block 56, and the use of such a material block 56 allows the main metal structure of the material 66 to be made martensitic structure and, at the same time, allows the amount of residual austenite to be made 2% or less in terms of capacity ratio. This makes it possible to greatly increase the durability in use of the manufacturing die 51.

The material block 56 can be subjected to the thermal refining in which the cooling rates of the future working members 53 and 53*b* are made as uniform as possible. As a result, the unevenness in metal structure can be made to such a level that substantially no problems occur, and metal structure that is most suitable for increase in die durability etc. can be distributed uniformly in the working members 53 and 53*b*. Therefore, the manufacturing dies 51 that are cut out from the material block 56 can be given sufficient durability to withstand physical loads that are imposed on the working members 53 and 53*b* at the time of plastic working.

The above embodiment is directed to the ink jet recording apparatus. However, the liquid ejecting head as a subject of manufacture using the die according to the invention is not only for ink for an ink jet recording apparatus, and can be such as to jet out glue, a manicure material, a conductive liquid (liquid metal), or the like. Further, although the above embodiment is directed to the ink jet recording head using ink which is a kind of liquid, the invention can be applied to general liquid ejecting heads for ejecting a liquid that include recording heads used for image recording apparatus such as printers, colorant ejecting heads for manufacture of color filters of liquid crystal displays etc., electrode material ejecting heads used for formation of electrodes of organic EL displays, FEDs (field emission displays), etc., and bioorganic material ejecting heads used for manufacture of biochips.

Although the invention has been described in detail by referring to a particular embodiment, it is apparent to a person skilled in the art that various changes and modifications are possible without departing from the spirit and scope of the invention.

This application is based on Japanese Patent Application No. 2003-191418 filed on Jul. 3, 2003, the disclosure of which is incorporated herein by reference.

As described above, in the manufacturing method of a die for manufacturing a liquid ejecting head and the material block used in the method according to the invention, the material block can be subjected to the thermal refining in which the cooling rates of future working members are made as uniform as possible. As a result, the unevenness in metal structure can be made to such a level that substantially no problems occur, and metal structure that is most suitable for increase in die durability etc. can be distributed uniformly in the working members. Therefore, dies that are cut out from the material block can be given sufficient durability to withstand physical loads that are imposed on the working members at the time of plastic working.

What is claimed is:

1. A method of manufacturing a die for forming recesses in a metallic plate which are adapted to be pressure generating chambers in a liquid ejecting head, the method comprising:

preparing a metallic block adapted to allow a plurality of dies arrayed in a first direction to be cut out, and having a flat end face extending in the first direction; and cutting out the dies from the metallic block, wherein a distance between a first part of each of the dies which is adapted to be working members for forming the recesses and the flat end face is made uniform, the method further comprising subjecting the metallic block to thermal refining in advance, so that at least the first part has a metal structure suitable for the function of the working members, wherein the metal structure is a martensite in which an amount of residual austenite is 2% or less in terms of a capacity ratio thereof.

* * * * *